Nov. 22, 1960 — B. POLL — 2,960,944
TRANSPLANTER CARRYING ARM
Filed Aug. 23, 1956 — 2 Sheets-Sheet 1
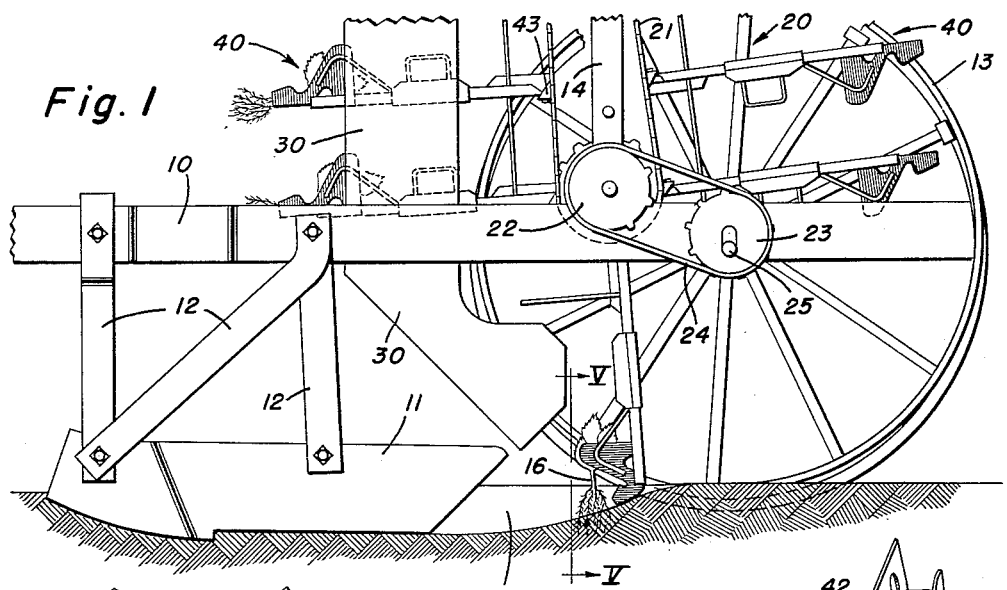
Fig. 1
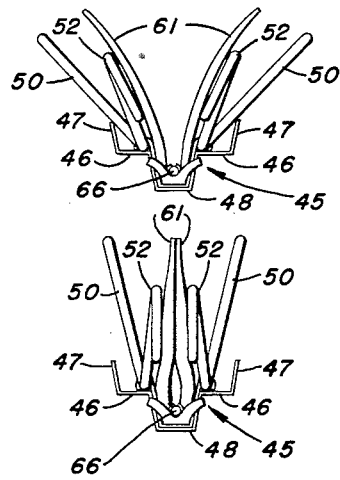
Fig. 3
Fig. 4
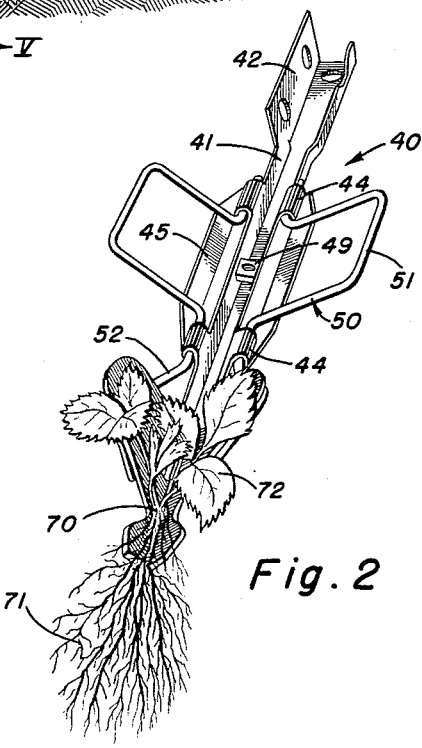
Fig. 2
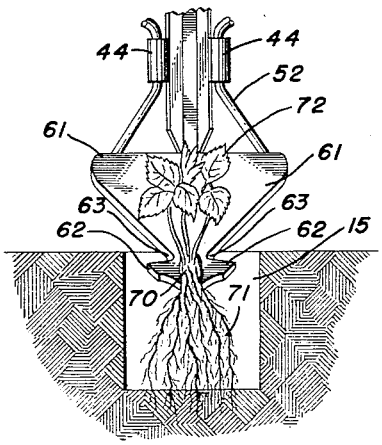
Fig. 5
INVENTOR.
Benjamin Poll
BY
ATTORNEYS

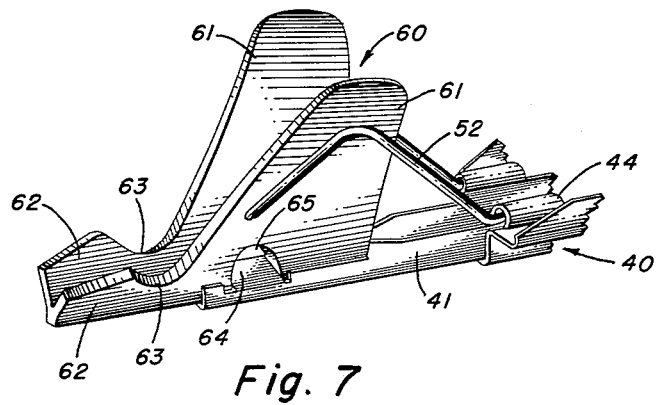
Fig. 7
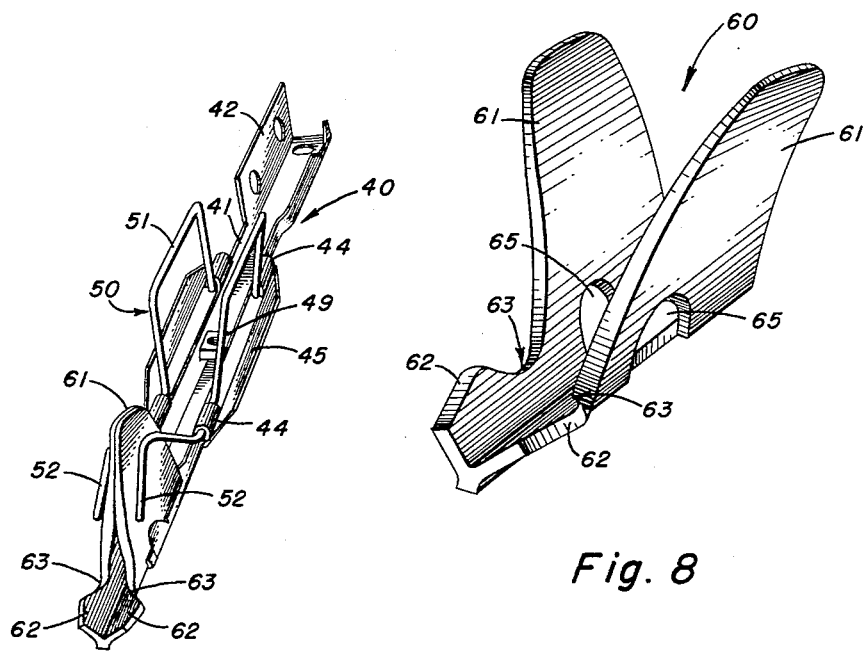
Fig. 6
Fig. 8
INVENTOR.
Benjamin Poll
BY
*Price and Heneveld*
ATTORNEYS United States Patent Office 2,960,944
Patented Nov. 22, 1960

2,960,944
TRANSPLANTER CARRYING ARM

Benjamin Poll, Holland, Mich., assignor to Holland Transplanter Company, Holland, Mich., a corporation of Michigan Filed Aug. 23, 1956, Ser. No. 605,908

8 Claims. (Cl. 111—2)

This invention relates to transplanting machines and more particularly to a plant carrying arm for such machines. The machine of this invention is of the type disclosed in my Patent No. 2,739,548 issued March 26, 1956. This invention is an improvement of the plant carrying arm of that patent.

The primary object of this invention is to provide a plant carrying arm having a pocket designed for transplanting plants with very little foliage but a large amount of roots.

Another object of this invention is to provide a plant carrying arm designed to eliminate faulty placing of plants with a large amount of roots.

Still another object of this invention is to provide a plant carrying arm which more exactly places such plants at the proper depth.

A further object of this invention is to provide a pocket for receiving and carrying plants, such pocket having two parts, one for the foliage and stem and the other for the plant roots.

Another object of this invention is to eliminate damage to the plant carrying arm normally caused by dragging it through the dirt.

Other objects of this invention will become obvious upon reading of the specification in conjunction with the accompanying drawings wherein:

Fig. 1 is an elevational view of the transplanter embodying the novel plant-grasping arm of this invention.

Fig. 2 is an enlarged, oblique view of the plant-grasping arm assembly of the machine illustrated in Fig. 1.

Fig. 3 is an elevational end view of the arm in open position.

Fig. 4 is an elevational end view of the arm in closed position.

Fig. 5 is a cross-sectional view taken along the plane V—V of Fig. 1.

Fig. 6 is an enlarged, oblique view of the plant-grasping arm assembly in closed position.

Fig. 7 is a partial, enlarged, oblique view of the arm illustrating the construction of the novel pocket and arms for actuating the pocket.

Fig. 8 is an oblique view of the one piece pocket of the type shown in the other figures.

Briefly, this invention is concerned with a plant-grasping arm of the type described in Patent No. 2,739,548. The arm of this invention is an improved arm having two pockets arranged in tandem. One pocket has flexible flaps adapted to be closed by clamping means disposed on each side. The second pocket is located outwardly of the first pocket and has a pair of ears appreciably shorter in length than the flaps. The flaps and ears are arranged so that actuation of the flaps by the clamping arms does not affect the ears. This invention is particularly adapted for short plants having little foliage but a great amount of roots.

Referring to the drawing, Fig. 1 discloses a transplanter that includes the frame 10. A plow shoe 11 is attached to frame 10 by the braces 12. Rearwardly of plow shoe 11 the frame rotatably supports the packing wheels 13. The plow shoe 11 opens a plant furrow 15 in which plants 16 are deposited by a conveying system hereinafter described. The furrow is closed by the wheels 13 located on opposite sides of the furrow. The wheels 13 are appropriately shaped for forcing the dirt into the furrow and packing it firmly about the roots of plant 16.

The conveying unit or carrier system for the plants includes the plant carrying arm assembly 40 mounted on the sprocket chain 21. The sprocket chain 21 is supported by sprocket 22 and a sprocket located immediately above it (not shown). These sprockets are rotatably supported by the vertical column 14.

The sprocket 22 is the driver and the one immediately above (not shown) is an idler. The sprocket 22 is driven by the sprocket and chain arrangement including the sprockets 23 and chain 24. Driving power for the sprocket 23 is supplied by the packing wheels 13 to which the sprocket 23 is directly connected by the shaft 25. With this arrangement as the wheels 13 rotate the sprocket 23 rotates at the same rate. This drives chain 24 and rotates sprocket 22 which in turn drives the conveying chain 21.

Plant carrying arm assemblies 40 are attached to the chain 21. These assemblies are properly spaced one from the other and arranged so as to extend perpendicular to the direction of the movement of the chain 21. The plant carrying arm assemblies have pockets adapted to receive the plants at a loading station located immediately above the cam plates 30. The assemblies then pass between the cam plates resulting in the pockets being closed and the plants being firmly grasped thereby as they are carried downwardly into the furrow where they are deposited. All of the mechanism for accomplishing this result is old and is described in more detail in my Patent Nos. 2,216,923 and 2,739,548.

This invention resides in the specific plant carrying arm assembly and more particularly in the pocket for such assembly. Plant carrying arm assembly 40 includes a beam 41 having an attachment flange 42 and an attachment means 43 (Fig. 1) at one end for securing the beam to the chain 21. The beam has a substantially U-shaped cross section. Intermediate its ends it has aligned rolled over ears 44 extending outwardly and downwardly and forming journals for the wire clamping rod members 50. Attached to the beam 41 at the ears 44 is a wing-shaped stop element 45 having the shoulders 46 and the stop wings 47 on each side of the beam. These stop wings and shoulders are connected by a channel-shaped web portion 48 in which the beam seats. The wing-shaped stop element 45 is secured to the beam by a bolt and nut arrangement 49.

The rolled over ears 44 cooperate with the shoulders 46 to form the journals for a pair of wire clamping rod members 50. The clamping members 50 are shaped to provide the cam engaging portions 51 and the flap-actuating portion 52. This construction of the beam, the wing-shaped stop elements, the bearing means, and the wire clamping members, is all shown in my Patent No. 2,739,548. The only difference is the shape of the flap-actuating portions which substantially conform to the shape of the pocket flaps.

The extended ends of the clamping portions angle downwardly toward each other. This creates an offset approximately equal to the diameter of the rod. These offset extensions close the flaps 61 all the way in order that flat leaves of plants with very little foliage are grasped. The rods are sufficiently resilient to permit flexing when plants of heavier foliage are grasped. This particular shape and the purpose and advantages thereof will be explained in more detail hereinafter.

A novel pocket unit is secured at the free end of the beam 41. This pocket unit (Fig. 8) includes two V-shaped pockets arranged in tandem. One of these pockets includes the flaps 61, each extending radially from the beam 41 and forming a V-shaped pocket that is symmetrical about a plane passing through the axis of the beam 41 and the circuitous path of the conveying means. This provides a pocket which is symmetrically open for receiving the plant. Flaps 61 are resilient and are adapted to be closed by the clamping members 50.

Extending beyond the end of flaps 61 is the second pocket formed by the ears 62. A notch 63 is provided intermediate the flaps and the ears. This notch serves two purposes. First, it makes the flap pocket independent of the ear pocket as far as closing the same is concerned. Thus, when the flaps are closed by the clamping members, the ears 62 remain open. The notch 63 also facilitates positive, proper, placing of the plant in the pocket unit. This is accomplished by the operator picking up the plant at the juncture of the roots and the stem, and placing his fingers carrying the plant into the notch 63. This will be explained in more detail under "Operation."

The ears 62 are appreciably shorter than flaps 61 for the purpose of preventing the pocket from becoming caught in the dirt of the furrow. The comparatively small surface area of the ears reduces the amount of contact with the dirt. This combined with the resiliency of the ear pocket permits it to be drawn through the dirt without damaging the plant carrying arm.

The pocket is constructed of a self-supporting material such as rubber. This material is pliable and flexible. The pocket is preferably formed of one symmetrical piece of material having a fold at the line of symmetry. It is possible within the broadest aspect of this invention to form the secondary or ear pocket from a rigid material. For example, the beam could be extending and a small pocket formed on its end in a position beyond the main pocket. This form, however, is not preferred because of its rigidity.

The pocket unit 60 is secured to the beam 41 in the same manner disclosed in my Patent No. 2,739,548. The tabs 64 of the beam extend through the opening 65 at the bottom of the pockets. The tabs are bent downwardly to receive a nail 66 (Figs. 4 and 5) which holds the pocket in the beam at the crease of the pocket.

*Operation*

The operation of the particular plant carrying arm of this invention begins with placing the plant 16 in the pocket 60 at the loading zone which is located above the cam plates 30. As previously stated, the plant carrying arm is more particularly adapted for those having a large amount of roots and very little foliage. Plants under this category are strawberries and many other types of plants.

In the plant carrying arm of Patent No. 2,739,548 the placing of these types of plants in the pockets is difficult. It is extremely important that they be placed so that the juncture 70 of these plants be located at the furrow level when deposited. In the arm of the type disclosed in Patent No. 2,739,548, plants such as strawberries have a large amount of roots and placing these plants in the pocket with the head 70 at the very end of the pocket frequently results in the plant falling out of the pocket before it is deposited in the furrow.

The pocket of this invention is designed to avoid this difficulty. The so-called secondary pocket formed by the ears 62 is provided to support a substantial portion of the roots so that the plant can be placed in the pocket and supported until deposited in the furrow.

In accordance with this invention I provide a positive means for assuring that the head 70 is located at a level immediately beneath the soil line. This is accomplished by providing the notch 63 which permits the operator to grasp the plant by the head 70 and place the head at the juncture between the flaps 61 and ears 62. This juncture in relation to the furrow is located at exactly the level of the soil. As a result, the head 70 is always located at the proper depth when the plants are deposited.

As the arm is carried downwardly by chain 21, the cam portions 51 pass between the spaced cam plates 30 resulting in the clamping elements being rotated toward each other. This flexes the flaps 61 toward each other closing the flap pocket to grasp the plants. In accordance with this invention the flap-actuating portions 52 of clamping elements 50 are shaped to conform with the shape of the flaps 61. They extend to the front edge of the flaps 61 and then are directed downwardly and inwardly toward each other along the front edge of the flaps. This construction provides a firmer grip on the plants by exerting a force on the flaps at a point lower than in the former pocket of my Patent No. 2,739,548. The offset extensions cause the flaps to close all the way on the flat leaves of plant with very little foliage. As a result this construction eliminates the plant being dropped by the pocket.

It should be evident from the drawings, particularly Figs. 3 and 4, that the flaps 61 are flexed independently of the ears. The notch 63 helps to obtain this result.

As the arm moves downwardly it eventually passes from between the cams. The clamping elements are then biased outwardly by the resiliency of the flaps. Separate springs can be provided for this purpose if desirable. When the pocket opens the plant is released at the proper depth.

It will be noted from Figs. 1 and 5 that the secondary pocket formed by ears 62 extends into the furrow 15 so that the plant is released at the proper depth. In the use of the pocket of my Patent No. 2,739,548 to transplant plants that require being placed deep in the furrow, extending the arm or flaps into the furrow would result in the flaps striking or rubbing against the dirt in the furrow with resultant excessive wear of the flaps or injury to the composite arm. In accordance with this invention the secondary pocket which is small and flexible easily passes through the furrow regardless of the dirt or debris in it. Although probably highly exaggerated for illustrative reasons, Figs. 1 and 5 disclose this feature of the ear pocket being flexed as it is drawn through the furrow. Because of this resiliency the pocket will work its way through the dirt without damage to it or the composite arm.

In its broadest aspect, this invention applies to a rigid secondary pocket, constructed in several possible forms; for example, by extending the beam beyond the flaps and providing a rigid pocket on its end. This form obviously has several disadvantages not encountered by the preferred form shown and described.

After releasing the plant 16, the arm 40 moves upwardly. Eventually it again reaches the loading station and then the above process is repeated.

Having described my invention, it should be understood that I have shown and described a preferred form. Other forms, embodiments and modifications are possible within the broadest aspect of this invention. Therefore, this invention is only limited as expressly set forth in the appended claims.

I claim:
1. A plant grasping arm for a planting machine having a conveying means with a circuitous movement and a plurality of the plant-grasping arms mounted each at one end in spaced relation on the conveying means, comprising: a beam extending normal to the direction of movement of the conveying means; means for securing said beam to the conveying means; a pair of flexible flaps extending substantially radially from the free end of said beam forming a V-shaped pocket symmetrical about a plane passing through said beam and the circuitous path of the conveying means; means for closing said flaps; and means forming a second V-shaped pocket symmetrical about said plane and located outwardly beyond said pocket for supporting roots of plants carried by said arm.

2. A plant grasping arm for a planting machine having a conveying means with a circuitous movement and a plurality of the plant-grasping arms mounted each at one end in spaced relation on the conveying means, comprising: a beam extending normal to the direction of movement of the conveying means; means for securing said beam to the conveying means; a pair of flexible flaps extending substantially radially from the free end of said beam forming a V-shaped pocket symmetrical about a plane passing through said beam and the circuitous path of the conveying means; a pair of ears located outwardly beyond said flexible flaps; said pair of ears forming a V-shaped pocket symmetrical about said plane; said ears being appreciably shorter than said flexible flaps; and oppositely disposed clamping members mounted on each side of said arm for relative movement with respect to said beam; said clamping members having flap-actuating portions for causing said flexible flaps to be flexed toward each other.

3. A plant grasping arm for a planting machine having a conveying means with a circuitous movement and a plurality of the plant-grasping arms mounted each at one end in spaced relation on the conveying means, comprising: a beam extending normal to the direction of movement of the conveying means; means for securing said beam to the conveying means; a pair of flaps forming a first pocket and a pair of ears forming a second pocket; said ears lying outwardly of said flaps; said flaps and ears being joined at their bases; said ears and flaps being constructed of flexible, substantially self-supporting material; and clamping means on each side of said beam for flexing said flaps toward each other to close said first pocket.

4. The plant carrying arm of claim 3 in which said clamping means comprises a finger extending across said flaps and then downwardly along the forward edge.

5. A plant grasping arm for a planting machine having a conveying means with a circuitous movement and a plurality of the plant-grasping arms mounted each at one end in spaced relation on the conveying means, comprising: a beam extending normal to the direction of movement of the conveying means; means for securing said beam to the conveying means; a pair of flaps forming a first pocket and a pair of ears forming a second pocket; said ears lying outwardly of said flaps; said flaps and ears being joined at their bases; said ears being appreciably shorter than said flaps; said ears and flaps being constructed of flexible, substantially self-supporting material; and clamping means on each side of said beam for flexing said flaps toward each other to close said first pocket.

6. The plant carrying arm of claim 5 in which said clamping means comprises fingers extending across said flaps and then downwardly along the forward edge.

7. The plant carrying arm of claim 5 in which said clamping means comprises fingers extending across said flaps and then downwardly along the forward edge; the downwardly extending ends of said fingers extending toward each other and being offset from the remaining portion of said fingers.

8. A plant grasping arm for a planting machine, having a conveying means with a circuitous movement and a plurality of plant-grasping arms mounted each at one end in spaced relation on the conveying means, comprising: a base extending normal to the direction of movement of the conveying means; means for securing said beam to the conveying means; first flaps forming a first V-shaped pocket on the end of said beam; said first pocket having flexible means adapted to close said first pocket; means for closing said flexible means; ears forming a second V-shaped pocket extending outwardly beyond said first pocket; and said ears appreciably shorter in length than said flaps.

References Cited in the file of this patent

UNITED STATES PATENTS

| | | |
|---|---|---|
| 398,754 | Stratton | Feb. 26, 1889 |
| 2,739,548 | Poll | Mar. 27, 1956 |
| 2,794,537 | Holliday | June 4, 1957 |

FOREIGN PATENTS

| | | |
|---|---|---|
| 882,330 | Germany | July 9, 1953 |